United States Patent
Wenthen

(10) Patent No.: US 9,017,204 B2
(45) Date of Patent: *Apr. 28, 2015

(54) CONTINUOUSLY VARIABLE TRANSMISSION FOR MOTOR VEHICLES

(71) Applicant: Magna Powertrain USA, Inc., Troy, MI (US)

(72) Inventor: David W. Wenthen, Syracuse, NY (US)

(73) Assignee: Magna Powertrain USA, Inc., Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/974,578

(22) Filed: Aug. 23, 2013

(65) Prior Publication Data

US 2013/0345007 A1 Dec. 26, 2013

Related U.S. Application Data

(63) Continuation of application No. 12/617,031, filed on Nov. 12, 2009, now Pat. No. 8,517,875.

(51) Int. Cl.
*B60K 17/04* (2006.01)
*B60K 6/365* (2007.10)
*F16H 3/72* (2006.01)

(52) U.S. Cl.
CPC ............. *F16H 3/725* (2013.01); *Y10T 477/20* (2015.01); *B60K 6/365* (2013.01); *B60K 17/046* (2013.01); *F16H 3/724* (2013.01)

(58) Field of Classification Search
CPC ... B60K 17/046; B60K 2007/00; B60K 6/365
USPC .............................. 475/149, 4, 5; 180/65.235
See application file for complete search history.

(56) References Cited

U.S. PATENT DOCUMENTS

| | | | | |
|---|---|---|---|---|
| 2,941,421 A | * | 6/1960 | Plotti | 475/182 |
| 4,592,454 A | * | 6/1986 | Michel | 192/3.23 |
| 6,524,206 B2 | * | 2/2003 | Tsunemi et al. | 475/83 |
| 6,852,053 B2 | * | 2/2005 | Nakano et al. | 475/5 |
| 6,994,646 B2 | * | 2/2006 | Ai | 475/5 |
| 7,223,199 B2 | * | 5/2007 | Willmot et al. | 475/339 |

FOREIGN PATENT DOCUMENTS

JP 02042236 A * 2/1990 ............ F16H 57/04

* cited by examiner

*Primary Examiner* — Tisha Lewis
(74) *Attorney, Agent, or Firm* — Dickinson Wrights PLLC

(57) ABSTRACT

A continuously variable transmission for transferring drive torque from a powertrain to a driveline in a motor vehicle includes a planetary gearset, a reaction motor, and a control system. The planetary gearset includes a sun gear driven by the powertrain, a ring gear driven by the reaction motor, a carrier driving the driveline, and pinion gears meshed with the sun gear and the ring gear. The control system controls the reaction motor to vary the speed of the ring gear and define a gear ratio between the sun gear and the carrier based on the ring gear speed.

15 Claims, 9 Drawing Sheets

CONTINUOUSLY VARIABLE TRANSMISSION FOR MOTOR VEHICLES

CROSS-REFERENCE TO RELATED APPLICATIONS

This application is a continuation of U.S. application Ser. No. 12/617,031 filed Nov. 12, 2009, the entire disclosure of which is incorporated herein by reference.

FIELD

The present disclosure relates to power transmission devices. More particularly, a transmission for transferring torque at a variable speed reduction ratio includes a planetary gear drive driven by two sources of power.

BACKGROUND

Geared transmissions typically function to change the rotational speed of a prime mover output shaft and an input shaft of a desired work output. In a vehicle, the prime mover may include a diesel or gasoline internal combustion engine. It should be noted that there are many more applications than automobiles and trucks. Locomotives are equipped with transmissions between their engines and their wheels. Bicycles and motorcycles also include a transmission. Speed-increasing transmissions allow large, slow-moving blades of a windmill to generate power much closer to a desired AC frequency. Other industrial applications exist. In each case, the motor and transmission act together to provide power at a desired speed and torque to do useful work. Geared transmissions have also been used in combination with electric motors acting as the prime mover.

Multiple speed transmissions have been coupled to high torque prime movers that typically operate within a narrow speed range, most notably structured as large displacement diesel engines of tractor trailers. Electric motors have a much wider speed range in which they operate effectively. However, the motor operates most efficiently at a single speed. Known multiple speed transmissions attempt to maintain an optimum operating speed and torque of the prime mover output shaft, but only approximate this condition due to the discrete gear ratios provided. Accordingly, a need for a simplified variable speed ratio power transmission device exists.

Many existing transmissions incorporate planetary gearsets within the torque path. A traditional planetary gear drive has three major components: a sun gear, an annulus ring gear and a planet carrier. When one of those components is connected to the prime mover, another is used as the output and the third component is not allowed to rotate. The input and output may rotate at different speeds, and may also rotate in opposite directions, with the ratio of input to output speeds being a fixed value. When the previously fixed third component is connected to a second input and forced to rotate, the transmission will have a continuously varying speed ratio dependent on the speeds of both the prime mover and this new second input. One example of such a planetary gear drive is made by Toyota. While planetary gearsets have been successfully used in vehicle power transmissions in the past, a need exists for a planetary drive and control system for optimizing the gear drive's efficiency and power density.

SUMMARY

This section provides a general summary of the disclosure, and is not a comprehensive disclosure of its full scope or all of its features.

A transmission for transferring torque from a prime mover includes a first input shaft adapted to be driven by the prime mover, a second input shaft and an output shaft. A compound planetary gearset includes a sun gear driven by the first input shaft, first pinion gears being driven by the sun gear, a ring gear fixed for rotation with the second input shaft and being meshed with second pinion gears, and a carrier driving the output shaft. A reaction motor drives the second input shaft. A controller controls the reaction motor to vary the speed of the second input shaft and define a gear ratio between the first input shaft and the output shaft based on the second input shaft speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure is directed to a transmission that can be adaptively controlled to transfer torque between a first rotary member and a second rotary member. The transmission finds particular application in motor vehicle drivelines such as, for example, a continuously variable torque transfer mechanism. Thus, while the transmission of the present disclosure is hereinafter described in association with particular arrangements for use in specific driveline applications, it will be understood that the arrangements shown and described are merely intended to illustrate embodiments of the present disclosure.

Figure 1:
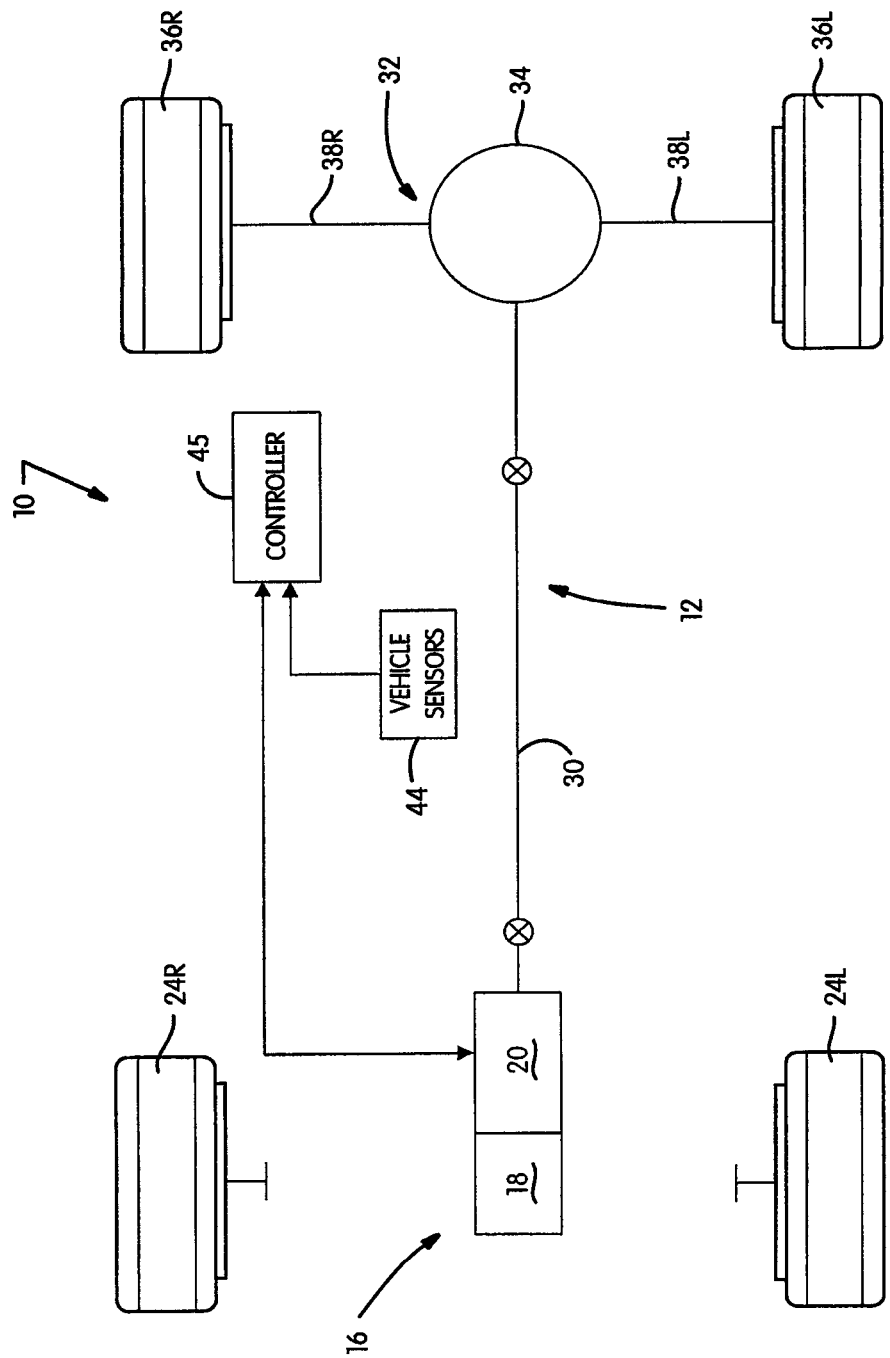
FIG. 1 is a schematic depicting an exemplary vehicle equipped with a transmission constructed in accordance with the teachings of the present disclosure.

With particular reference to FIG. 1 of the drawings, a drivetrain 10 for an all-wheel drive vehicle is shown. Drivetrain 10 includes a driveline 12 and a powertrain 16 for delivering rotary tractive power (i.e., drive torque) to the driveline. In the particular arrangement shown, driveline 12 is the rear driveline. Powertrain 16 is shown to include an engine 18 and a transmission 20. A pair of front wheels 24L and 24R are not driven. Driveline 12 includes a propshaft 30 driven by transmission 20 and a rear axle assembly 32 for transferring drive torque from engine 18 to a rear differential 34. A pair of rear axleshafts 38L and 38R interconnect rear differential 34 to corresponding rear wheels 36L and 36R.

Figure 2:
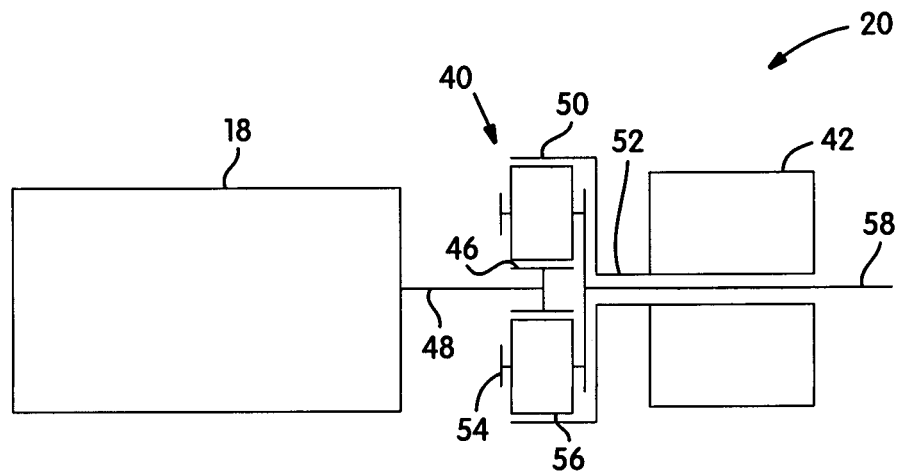
FIG. 2 is a schematic representation of a transmission having a simple planetary gearset.

As shown in FIGS. 1 and 2, transmission 20 includes a planetary gearset 40 and a reaction motor 42. Drivetrain 10 is shown to further include vehicle sensors 44 for detecting certain dynamic and operational characteristics of the motor vehicle and a controller 45 for controlling actuation of reaction motor 42 in response to input signals from vehicle sensors 44.

Planetary gearset 40 includes a sun gear 46 fixed for rotation with an output shaft 48 of engine 18. An annulus ring gear 50 is fixed for rotation with an output shaft 52 of reaction motor 42. Planetary gearset 40 also includes a carrier 54 rotatably supporting a plurality of pinion gears 56 that are each in constant meshed engagement with annulus ring gear 50 and sun gear 46. An output shaft 58 is fixed for rotation with carrier 54. The remainder of this disclosure discusses how the sun gear speed $\omega_S$ to carrier speed $\omega_C$ ratio is a function of an annulus ring gear speed $\omega_R$ to sun speed $\omega_S$ ratio in simple and compound planetary gearsets and how the asymptotic nature of this speed ratio may be exploited to improve the gear drive's efficiency and power density.

If a positive direction of annulus ring rotation is defined to be in the same direction as that of the sun gear and carrier assembly, it can be shown that in the general case, the ratio of sun to carrier speeds is given by:

$$\frac{\omega_S}{\omega_C} = \frac{z_S + z_R}{z_S}\left[1 - \left(\frac{\omega_R z_R}{\omega_S z_S + \omega_R z_R}\right)\right] \quad (1)$$

where $\omega_S$, $\omega_C$, and $\omega_R$ are the sun, carrier and annulus ring angular velocities and $z_R$ and $z_S$ are the number of teeth in the annulus ring and sun gears, respectively. Note that if $\omega_R=0$, equation (1) simplifies to the familiar relationship between sun and carrier speeds for a fixed annulus ring.

We define the ratio of ring speed to sun speed as $$\Omega = \frac{\omega_R}{\omega_S} \quad (2)$$

Equation (1) may then be rewritten as $$\frac{\omega_S}{\omega_C} = \frac{z_R + z_S}{z_S + \Omega \cdot z_R} \quad (3)$$

Figure 3:
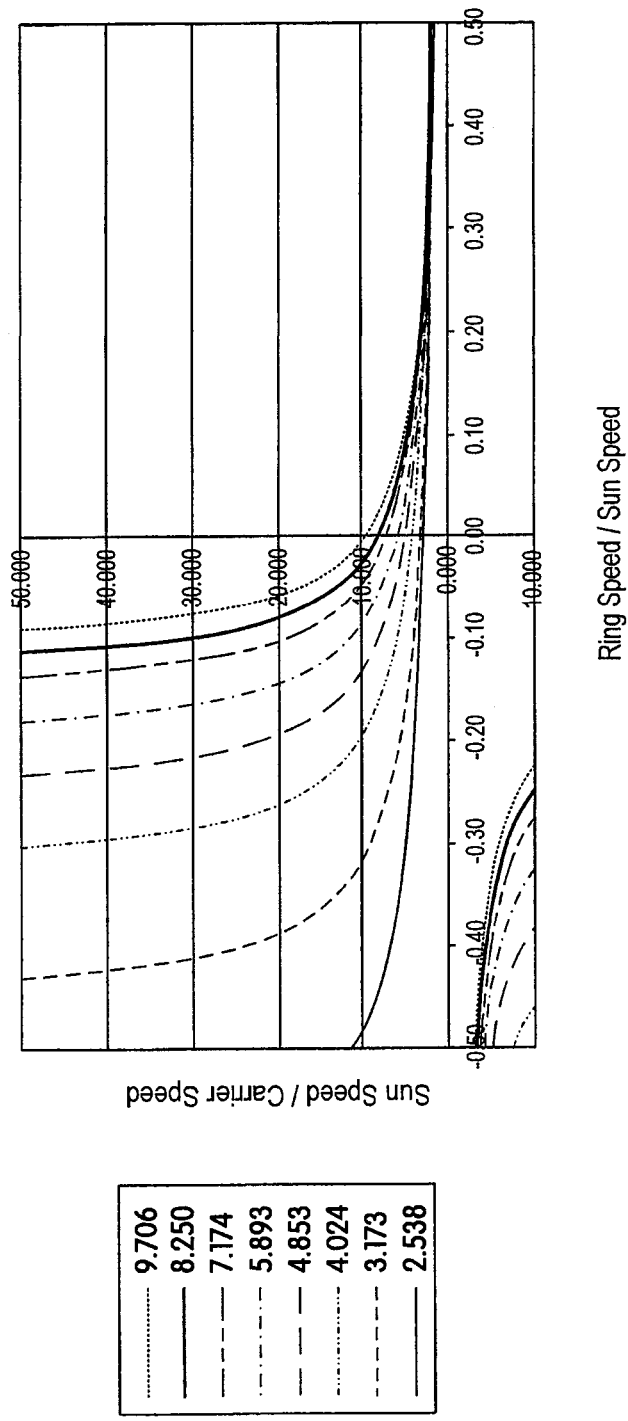
FIG. 3 is a graph depicting sun speed to carrier speed ratio versus ring speed to sun speed ratio for a number of fixed ring ratios of a simple planetary gearset.

It can be noted that there will be a value of $\Omega$ for which $\omega_S/\omega_C$ will become asymptotic. FIG. 3 shows equation (3) plotted against the ring to sun speed ratio for different numbers of ring and sun gear teeth. Each curve is labeled with its carrier to sun fixed ring ratio (FRR). Table 1 lists the number of teeth in the sun, planets and ring of each planetary combination, as well as each tooth combination's FRR. The combinations of sun, planet and ring gear tooth numbers were selected to span the practical limits of geometry limitations.

FIG. 3 plots the speed ratio $\omega_S/\omega_C$ against $\Omega$ for various FRR values listed in Table 1 and shows that the vertical asymptote increases from $\Omega=-0.650$ to $-0.115$ as the FRR increases. More importantly, the magnitude of the $\omega_S/\omega_C$ slope as the curve crosses the ordinate axis $\Omega=0$ increases as well. As the magnitude of the $\omega_S/\omega_C$ slope increases, the annulus ring speed required to effect a change in the speed ratio $\omega_S/\omega_C$ decreases dramatically. The annulus ring gear 50, however, is the largest of all component gears in the planetary gearset 40. As such, a relatively large torque may need to be reacted by reaction motor 42. The torque necessary to supply a sufficient reaction to pinion gears 56 may be quite large as well.

The sensitivity of the speed ratio to its fixed ring ratio is quantified by defining the ratio of the highest to lowest speed ratios as $\Delta$ for an arbitrary value of $\Omega$ selected as +/−10% of the sun's speed, as well as the value of $\Omega$ for the vertical asymptote. Table 1 presents this data.

TABLE 1

Simple Planetary Tooth Combinations

| Numbers of Teeth | | | Fixed Ring | Ratio Spread $\Delta = (\omega_S/\omega_C)_{MAX}/$ | Vertical |
|---|---|---|---|---|---|
| Sun $z_S$ | Planets $z_P$ | Ring $z_R$ | Speed Ratio $(z_S + z_R)/z_S$ | $(\omega_S/\omega_C)_{MIN}$ $-0.1 < \Omega < 0.1$ | Asymptote $\Omega = \omega_R/\omega_S$ |
| 17 | 65 | 148 | 9.706 | 14.455 | −0.115 |
| 20 | 62 | 145 | 8.250 | 6.273 | −0.138 |
| 23 | 59 | 142 | 7.174 | 4.227 | −0.162 |
| 28 | 54 | 137 | 5.893 | 2.916 | −0.204 |
| 34 | 48 | 131 | 4.853 | 2.254 | −0.260 |
| 41 | 41 | 124 | 4.024 | 1.867 | −0.331 |
| 52 | 30 | 113 | 3.173 | 1.555 | −0.460 |
| 65 | 17 | 100 | 2.538 | 1.364 | −0.650 |

Figure 4:
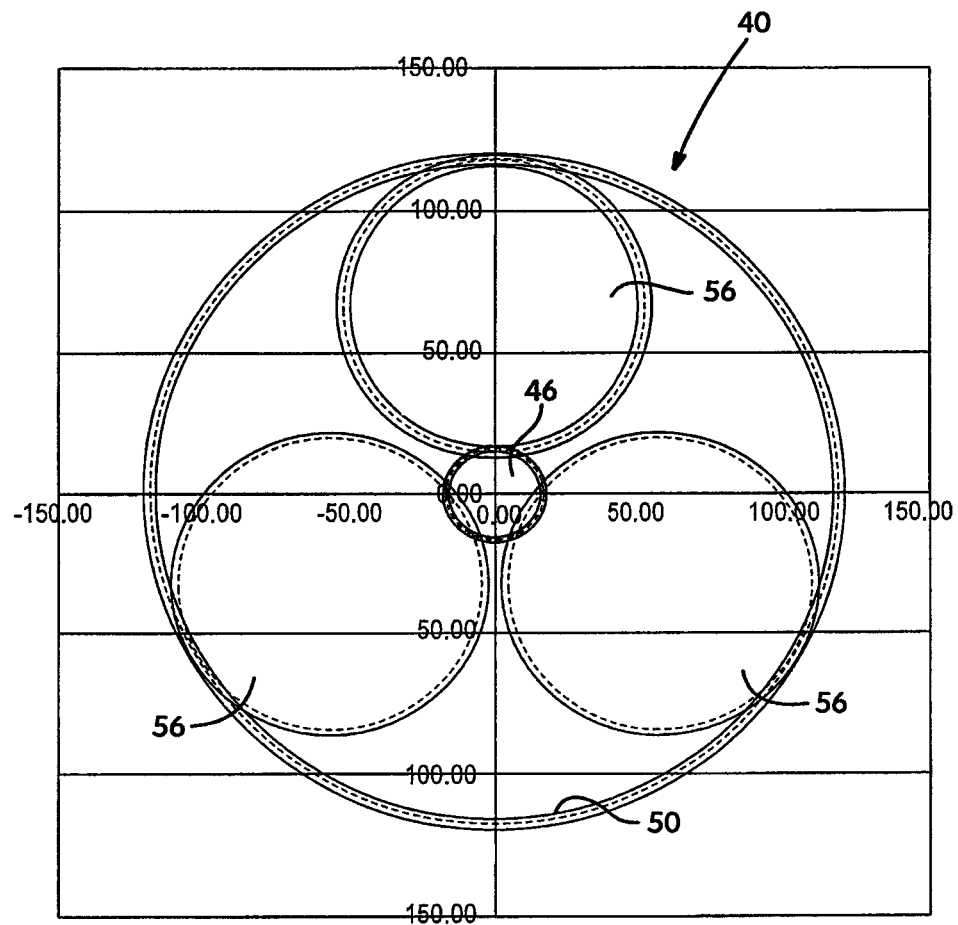
FIG. 4 depicts relative diameters of sun, planet and annulus ring gears for a planetary gearset having a fixed ring ratio of 9.706.

Table 1 and FIG. 3 illustrate that a large fixed ring ratio (FRR) is necessary to have the desirable feature of $\omega_S/\omega_C$ speed ratio sensitivity. Design constraints may exist where such a large FRR is not practical. FIG. 4 shows the relative diameters of the sun, planets and annulus ring of the 9.706 FRR planetary. The relatively small sun size will limit the strength of the shaft on which the sun gear is fixed. Furthermore, just as there is a minimum practical FRR, below which the planet pinions are too small to be supported with rolling element bearings, there is a maximum FRR, above which the tips of the planet pinions will interfere.

Figure 5:
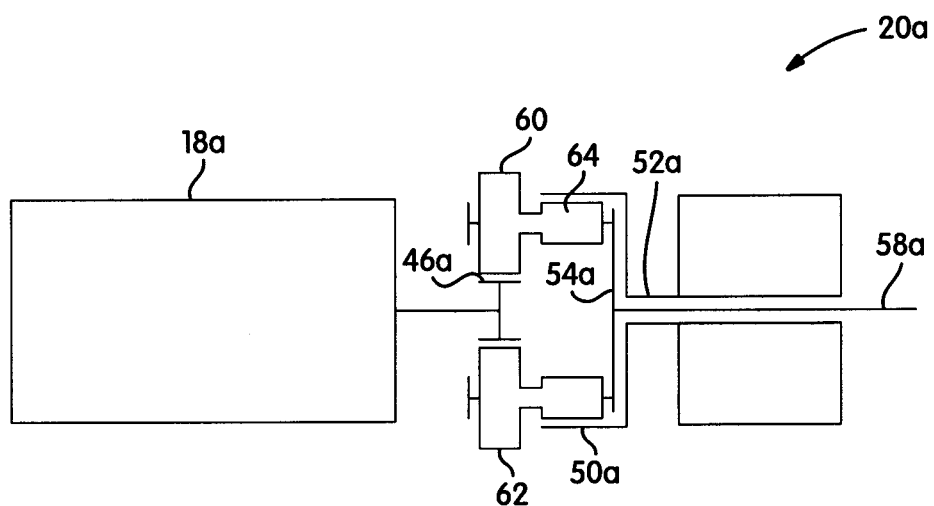
FIG. 5 is a schematic depicting a transmission equipped with a compound planetary gearset.

FIG. 5 depicts an alternative transmission 20a having a compound planetary gearset 40a in lieu of simple planetary gearset 40. Alternative transmission 20a is substantially similar to transmission 20. Accordingly, like elements will be identified with reference numerals including an "a" suffix. Planetary gearset 40a differs from simple planetary gearset 40 in that compound pinion gears 60 replace pinion gears 56. Each compound pinion gear 60 includes a first pinion gear 62 in meshed engagement with sun gear 46a as well as a reduced diameter second pinion gear 64 in constant meshed engagement with annulus ring gear 50a. First pinion gears 62 have a predetermined number of teeth, module, pressure angle and helix angle based on the mesh with sun gear 46a. Second pinion gears 64 have a reduced number of teeth, a different module, pressure angle and helix angle for the gear meshes with annulus ring gear 50a. The compound planetary gearset provides a minimized inner and outer radial packaging. Furthermore, the compound planetary gearset provides a greater reduction gear ratio. It should be appreciated that first pinion gears 62 and second pinion gears 64 are aligned in pairs to rotate on common pinion centers.

To operate on the same pinion centers, the module, helix angle and number of teeth must satisfy this constraint:

$$\frac{m_R \cos\beta_S}{m_S \cos\beta_R} = \frac{z_S + z_{PS}}{z_R - z_{PR}} \quad (4)$$

where $m_R$ and $m_S$ are the normal modules of the ring and sun meshes, respectively. The planet pinions $z_{PS}$ and $z_{PR}$ mesh with the sun and annulus, respectively. In addition to the geometry constraint of equation (4), each of the compound planet pinions independent meshes must have the same torque, but because each torque will act at different pitch geometries, the tooth loads may differ significantly and require largely different modules as a result.

If the design of a compound planetary gear set is modified to allow for an annulus gear that may move at a controlled angular speed while still providing the necessary reaction torque for the planet pinions, a similar asymptotic behavior to that seen in FIG. 3 exists. With the same reasoning used to develop equations (1) and (2), it can be shown that the speed ratio $\omega_S/\omega_C$ of a compound planetary gear set, in which the annulus gear is allowed to rotate is given by:

$$\frac{\omega_S}{\omega_C} = \frac{z_R \cdot z_{PS} + z_S \cdot z_{PR}}{z_S \cdot z_{PR} + \Omega \cdot z_R \cdot z_{PS}} \quad (5)$$

Figure 6:
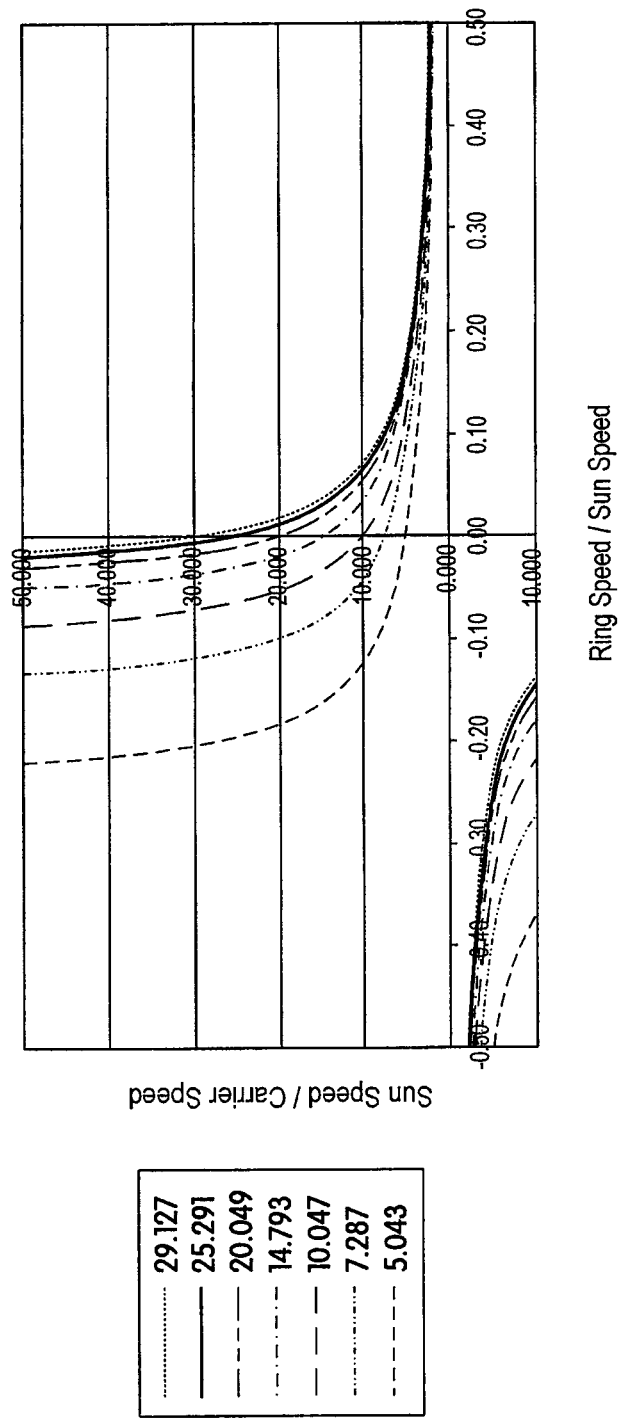
FIG. 6 is a graph depicting sun speed to carrier speed ratio versus ring speed to sun speed ratio for a number of compound planetary gearsets.

As with equations (1) and (2), equation (5) reduces to the familiar speed relationship for a fixed annulus ring when $\Omega=0$. Since a compound planetary gear set is capable for a larger speed ratio $\omega_S/\omega_C$, the benefits of the asymptotic nature of equation (5) can be more fully exploited. FIG. 6 shows the sun-carrier speed ratios again plotted against ring-sun speed ratios for different fixed ring ratios.

TABLE 2

Compound Planetary Tooth Combinations

| Numbers of Teeth | | | | Fixed Ring | Ratio Spread |
| --- | --- | --- | --- | --- | --- |
| Sun $z_S$ | Planets (Sun) $z_{PS}$ | Planets (Ring) $z_{PR}$ | Ring $z_R$ | Speed Ratio $(z_S z_{PR} + z_R z_{PS})/(z_S z_{PR})$ | $\Delta = (\omega_S/\omega_C)_{MAX}/(\omega_S/\omega_C)_{MIN}$ $-0.03 < \Omega < 0.03$ |
| 19 | 79 | 17 | 115 | 29.127 | 11.805 |
| 22 | 79 | 17 | 115 | 25.291 | 6.373 |
| 23 | 76 | 17 | 98 | 20.049 | 3.667 |
| 29 | 68 | 17 | 100 | 14.793 | 2.412 |
| 35 | 64 | 19 | 94 | 10.047 | 1.745 |
| 37 | 50 | 23 | 107 | 7.287 | 1.465 |
| 47 | 46 | 23 | 95 | 5.043 | 1.276 |

As was done for simple planetary gear drives, tooth combinations shown in Table 2 were selected to attempt to span the practical FRR limits. A FRR less than 5.043 would most likely not justify the additional complexity and expense of a compound planetary over a simple planetary and a FRR larger than 30 may not be practical, as can be seen from FIG. 6. It is also noted that in comparing FIGS. 3 and 6, it can be seen for a given FRR a compound planetary will have a larger asymptote value than a simple planetary.

Figure 7:
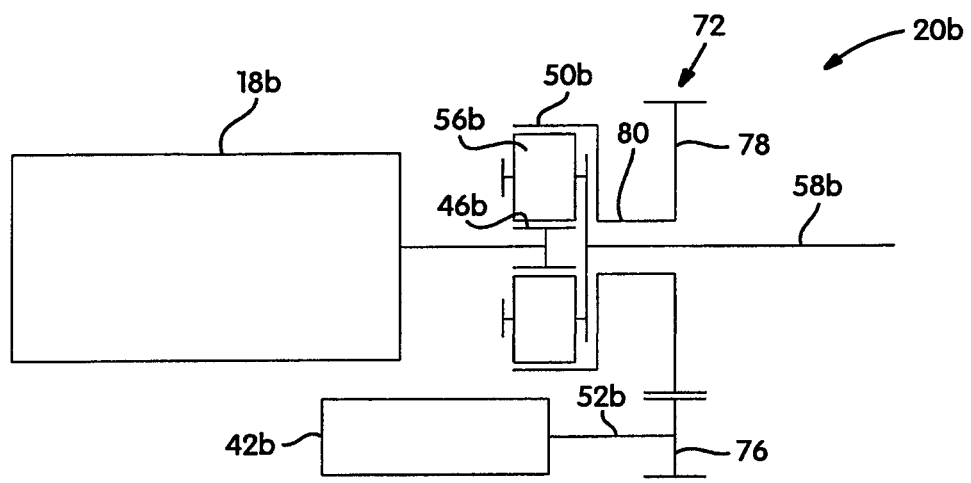
FIG. 7 is a schematic of an alternate transmission including a simple planetary gearset and an offset motor and speed reduction unit.

FIG. 7 depicts an alternate transmission 20b and is constructed substantially similarly to transmission 20. Similar elements will be identified with like reference numerals including a "b" suffix. A reaction motor 42b includes an output shaft 52b that extends offset and parallel to an axis of rotation of output shaft 58b. Reaction motor 42b drives a reduction gearset 72 to rotate ring gear 50b. Reduction gearset 72 includes a first gear 76 fixed for rotation with output shaft 52b. A second gear 78 is in constant meshed engagement with first gear 76 and is fixed for rotation with a concentric shaft 80. Annulus ring gear 50b is also fixed for rotation with concentric shaft 80.

Figure 8:
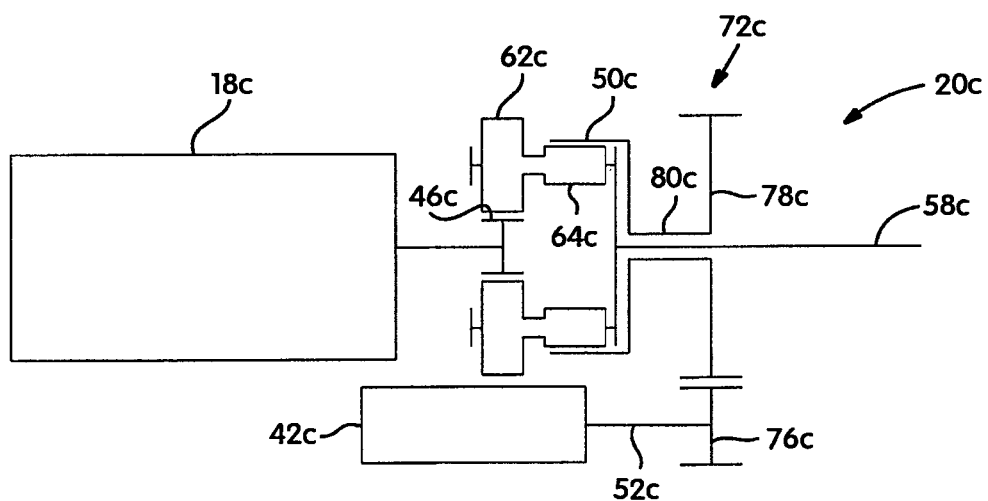
FIG. 8 is a schematic depicting another transmission having a compound planetary gearset driven by an offset reaction motor and speed reduction unit.

FIG. 8 depicts an alternate transmission identified at reference numeral 20c. Transmission 20c includes the offset motor and speed reduction unit arrangement shown in FIG. 7 being used in conjunction with the compound planetary gearset first described at FIG. 5. Accordingly, similar elements will be identified with like reference numerals including a "c" suffix. In operation, reaction motor 42c drives first gear 76c and second gear 78c to rotate annulus ring gear 50c and vary the output ratio provided to output shaft 58c.

Figure 9:
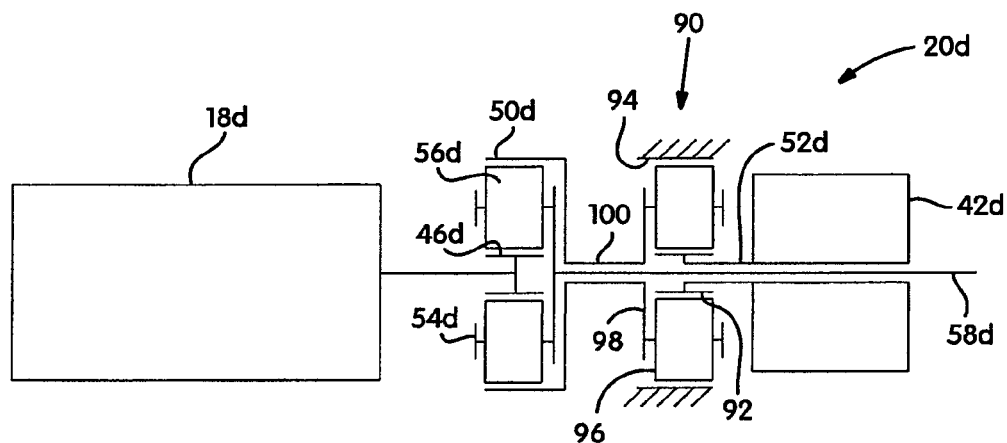
FIG. 9 is a schematic of another transmission including two simple planetary gearsets.

FIG. 9 depicts another alternate transmission identified at reference numeral 20d. Transmission 20d is substantially similar to transmission 20 with the addition of a planetary reduction gearset 90. Similar elements will be identified with like reference numerals having a "d" suffix. Planetary gearset 90 includes a sun gear 92 fixed for rotation with reaction motor output shaft 52d. Reaction motor output shaft 52d is concentrically aligned with and circumscribes output shaft 58d. A ring gear 94 is restricted from rotation. A plurality of pinion gears 96 are supported for rotation on a carrier 98. Pinion gears 96 are each meshed with sun gear 92 and ring gear 94. Carrier 98 is fixed for rotation with a concentric shaft 100. Annulus ring gear 50d is also fixed for rotation with concentric shaft 100.

Figure 10:
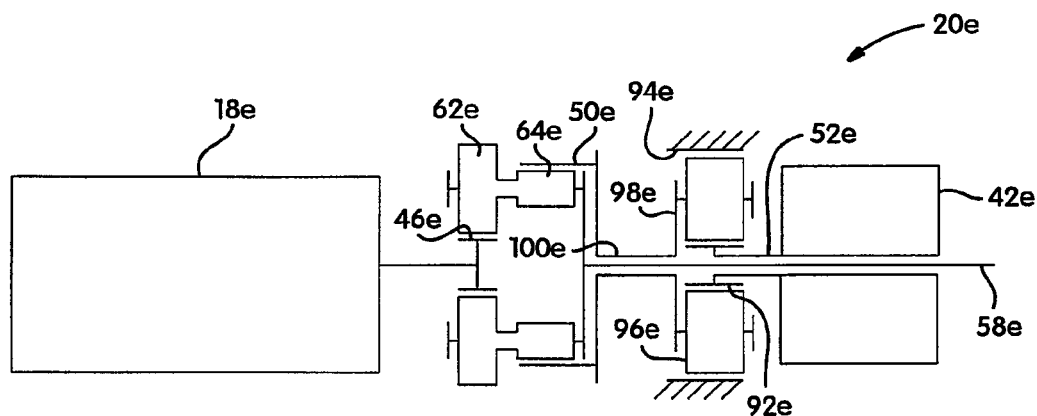
FIG. 10 is a schematic of another transmission equipped with a compound planetary gearset and a simple planetary reduction gearset.

FIG. 10 depicts another alternate transmission 20e that incorporates the planetary reduction gearset of FIG. 9 and mates it with the compound planetary gear arrangement shown in FIG. 5. Similar elements will be identified with like reference numerals having a "e" suffix. Reaction motor 42e includes an output shaft 52e transferring torque to planetary reduction unit 90e. Carrier 98e is fixed for rotation with concentric shaft 100e and annulus ring gear 50e.

Figure 11:
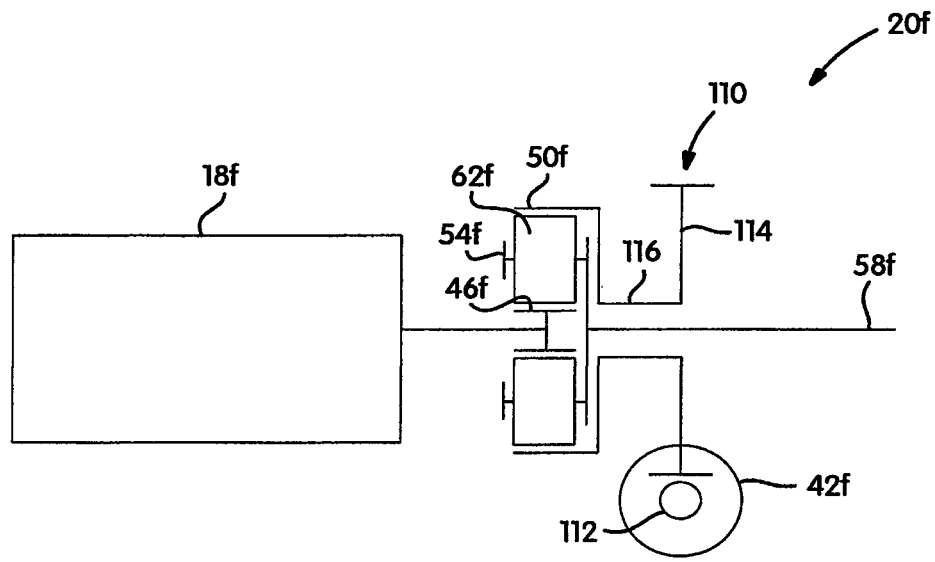
FIGS. 11 and 12 depict alternate transmissions including worm and worm wheel drives.
Figure 12:
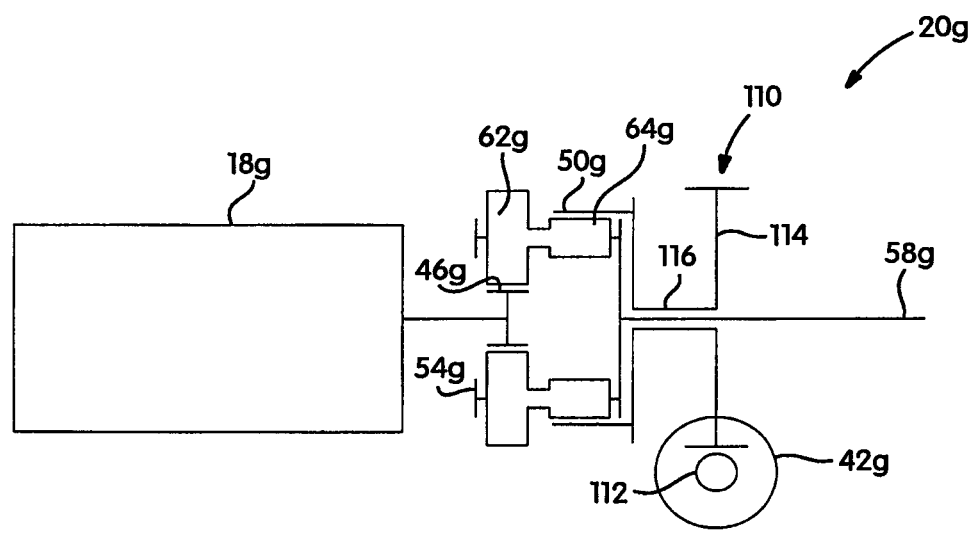

FIGS. 11 and 12 depict alternate transmissions 20f and 20g, respectively. Each of transmissions 20f, 20g include a worm drive 110 including a reaction motor 42f, 42g, driving a worm gear 112 along an axis of rotation that extends substantially perpendicular to an axis of rotation of output shaft 58f, 58g. Worm gear 112 is in constant meshed engagement with a worm wheel 114. Worm wheel 114 is fixed for rotation with a concentric shaft 116. In FIG. 11, concentric shaft 116 is fixed for rotation with annulus ring gear 50f. In similar fashion, concentric shaft 116 of FIG. 12 is fixed for rotation with annulus ring gear 50g.

Figure 13:
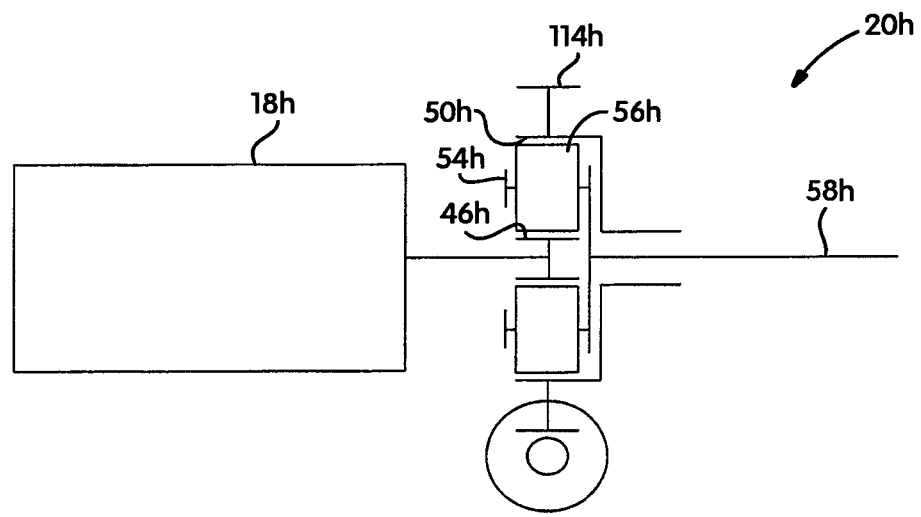
FIGS. 13 and 14 depict alternative transmissions including concentrically arranged worm drive mechanisms.
Figure 14:
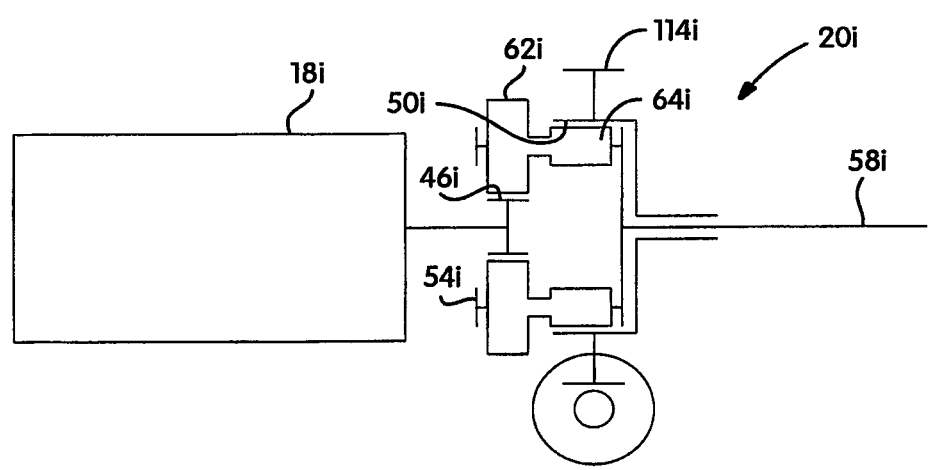

FIGS. 13 and 14 also depict alternative transmissions identified at reference numerals 20h and 20i, respectively. FIGS. 13 and 14 are substantially similar to FIGS. 11 and 12 except that worm wheels 114h, 114i concentrically surround annular ring gears 50h and 50i.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A continuously variable transmission for transmitting drive torque from a powertrain to a driveline in a motor vehicle, the continuously variable transmission comprising:
   a compound planetary gearset including a sun gear being driven by the powertrain, a ring gear, a carrier driving the driveline, a first pinion gear supported by said carrier and in meshed engagement with said sun gear, and a second pinion gear rotatably supported by said carrier and meshed with said ring gear;
   a reaction motor driving said ring gear;
   a control system for controlling said reaction motor to vary a rotary speed of said ring gear and establish a gear ratio between said sun gear and said carrier based on the speed of said ring gear, wherein a ratio of sun gear speed to carrier speed versus a ratio of ring gear speed to sun gear speed is asymptotic;
   a first input shaft interconnecting the powertrain to said sun gear;
   a second input shaft interconnecting said reaction motor to said ring gear; and
   an output shaft interconnecting said carrier to the driveline, wherein said reaction motor surrounds said output shaft such that said second input shaft is concentric relative to said output shaft.

2. The continuously variable transmission of claim 1 wherein a vertical asymptote of said ratio of sun gear speed to carrier speed versus said ratio of ring gear speed to sun gear speed ranges between about 0.00 and −0.25 for fixed ring speed ratio values of said compound planetary gearset ranging between 5.043 and 29.127.

3. The continuously variable transmission of claim 1 wherein said first input shaft is collinearly aligned relative to said second input shaft with said compound planetary gearset being disposed between the powertrain and said reaction motor.

4. The continuously variable transmission of claim 1 further including a reduction gearset disposed between said second input shaft and said output shaft.

5. The continuously variable transmission of claim 4 wherein said reduction gearset includes a first reduction gear driven by said second input shaft and which is meshed with a second reduction gear driving said ring gear, and wherein said reduction unit is configured to establish a reduced speed ratio drive connection between said reaction motor and said ring gear.

6. The continuously variable transmission of claim 4 wherein said reduction gearset includes a planetary gearset having a fixed ring gear, a sun gear driven by said second input shaft, a carrier driving said ring gear of said compound planetary gearset, and planet gears rotatably supported by said carrier and meshed with said fixed ring gear and said sun gear.

7. The continuously variable transmission of claim 4 wherein said reduction gearset includes a worm gear fixed to one of said second input shaft and said ring gear and a worm wheel fixed for rotation with the other of said second input shaft and said ring gear.

8. The continuously variable transmission of claim 1 wherein said first pinion gear and said second pinion gear are aligned to rotate about a common rotary axis.

9. The continuously variable transmission of claim 8 wherein said first pinion gear is fixed to said second pinion gear to define a compound pinion gear that is rotatably supported by said carrier.

10. A continuously variable transmission for transmitting drive torque from a powertrain to a driveline in a motor vehicle, the continuously variable transmission comprising:
   an epicyclic planetary gearset including a sun gear driven by the powertrain, a carrier driving the driveline, a ring gear, and pinion gears rotatably supported by said carrier and in meshed engagement with said sun gear and said ring gear;
   a reaction motor driving said ring gear;
   a control system for controlling said reaction motor to vary a rotary speed of said ring gear and establish a gear ratio between said sun gear and said carrier based on the speed of said ring gear, wherein a ratio of sun gear speed to carrier speed versus a ratio of ring gear speed to sun gear speed is asymptotic;
   a first input shaft interconnecting the powertrain to said sun gear;
   a second input shaft interconnecting said reaction motor to said ring gear; and
   an output shaft interconnecting said carrier to the driveline, wherein said second input shaft is concentrically arranged relative to said output shaft, and wherein said first and second input shafts and said output shaft all rotate about a common rotary axis.

11. The continuously variable transmission of claim 10 wherein a vertical asymptote of said ratio of sun gear speed to carrier speed versus said ratio of ring gear speed to sun gear speed ranges between about −0.115 and −0.650 for fixed ring speed ratio values of said epicyclic planetary gearset ranging between 2.5 and 9.7.

12. A continuously variable transmission for transmitting drive torque from a powertrain to a driveline in a motor vehicle, the continuously variable transmission comprising:
   an epicyclic planetary gearset including a sun gear driven by the powertrain, a carrier driving the driveline, a ring gear, and pinion gears rotatably supported by said carrier and in meshed engagement with said sun gear and said ring gear;
   a reaction motor driving said ring gear;
   a first input shaft interconnecting the powertrain to said sun gear;
   a second input shaft interconnecting said reaction motor to said ring gear;
   an output shaft interconnecting said carrier to the driveline; and
   a control system for controlling said reaction motor to vary a rotary speed of said ring gear and establish a gear ratio between said sun gear and said carrier based on the speed of said ring gear, wherein a ratio of sun gear to carrier speed versus a ratio of ring gear speed to sun gear speed is asymptotic, wherein said first input shaft and said output shaft rotate about a first rotary axis, wherein said second input shaft rotates about a second rotary axis, and wherein a reduction gearset is disposed between said second input shaft and said ring gear of said epicyclic planetary gearset.

13. A continuously variable transmission for transmitting drive torque from a powertrain to a driveline in a motor vehicle, comprising;
   a gearset including a sun gear driven by the powertrain, a carrier driving the driveline, a ring gear, and pinion gears rotatably supported by said carrier and in meshed engagement with said sun gear and said ring gear;
   a reaction motor driving said ring gear;
   a controller for controlling said reaction motor to vary a rotary speed of said ring gear, wherein the number of teeth on said sun gear, said ring gear and said pinion gears are selected such that a ratio of sun gear speed to carrier speed versus a ratio of ring gear speed to sun gear speed is asymptotic;

a first input shaft interconnecting an output of the powertrain to said sun gear;
a second input shaft interconnecting an output of said reaction motor to said ring gear; and
an output shaft interconnecting said carrier to an input of the driveline, wherein said reaction motor surrounds said output shaft such that said second input shaft is concentric relative to said output shaft.

14. The continuously variable transmission of claim 13 wherein said gearset is a simple planetary gearset, and wherein a vertical asymptote of said ratio of sun gear speed to carrier speed versus said ratio of ring gear speed to sun gear speed ranges between about −0.115 and −0.650 for fixed ring speed ratio values ranging between about 2.5 and 9.7.

15. The continuously variable transmission of claim 13 wherein said gearset is a compound planetary gearset having compound pinion gears meshed with said sun gear and said ring gear, and wherein a vertical asymptote of said ratio of sun gear speed to carrier speed versus said ratio of ring gear speed to sun gear speed ranges between about 0.00 and −0.25 for fixed ring speed ratio values ranging between about 5.043 and 29.127.

* * * * *